(12) United States Patent
White

(10) Patent No.: US 7,980,241 B1
(45) Date of Patent: Jul. 19, 2011

(54) PORTABLE AND ADJUSTABLE GRILLING APPARATUS FOR OUTDOOR COOKING

(76) Inventor: Kevin A. White, Manning (CA)

( * ) Notice: Subject to any disclaimer, the term of this patent is extended or adjusted under 35 U.S.C. 154(b) by 573 days.

(21) Appl. No.: 12/228,749

(22) Filed: Aug. 15, 2008

(51) Int. Cl.
*A47J 37/00* (2006.01)
*A47J 37/07* (2006.01)

(52) U.S. Cl. ....... 126/30; 126/9 R; 126/25 A; 126/25 R; 126/25 AA; 248/127; 248/163.2; 248/178.1

(58) Field of Classification Search ............ 126/30, 126/25 A, 25 R, 9 R, 25 AA; 248/127, 163.2, 248/178.1
See application file for complete search history.

(56) References Cited

U.S. PATENT DOCUMENTS

| 440,453 | A | * | 11/1890 | J.A Wilson | ............ | 126/333 |
|---|---|---|---|---|---|---|
| 3,537,388 | A | | 11/1970 | Martin | | |
| D271,740 | S | | 12/1983 | Borglum | | |
| 4,732,138 | A | | 3/1988 | Vos | | |
| 4,854,297 | A | | 8/1989 | Shuman | | |
| D315,846 | S | | 4/1991 | Hatzenbeller | | |
| D337,933 | S | * | 8/1993 | Gryz | ............ | D7/332 |
| 5,297,534 | A | | 3/1994 | Louden | | |
| 5,406,931 | A | | 4/1995 | Montgomery | | |
| 5,666,940 | A | | 9/1997 | Kreiter | | |
| 5,819,718 | A | | 10/1998 | Leiser | | |
| 5,908,026 | A | * | 6/1999 | Forst | ............ | 126/25 AA |
| 5,931,085 | A | * | 8/1999 | Benzschawel | ............ | 99/449 |
| 5,944,009 | A | | 8/1999 | Scheller | | |
| 6,070,571 | A | | 6/2000 | Bradbury | | |
| 6,131,560 | A | * | 10/2000 | Healy | ............ | 126/30 |
| 6,298,843 | B1 | * | 10/2001 | Olsen et al. | ............ | 126/30 |
| 6,386,192 | B1 | | 5/2002 | Weber | | |
| 6,926,238 | B1 | * | 8/2005 | Blessing | ............ | 248/129 |
| 7,140,362 | B1 | * | 11/2006 | Johnston | ............ | 126/25 A |

\* cited by examiner

*Primary Examiner* — Steven B McAllister
*Assistant Examiner* — Nikhil Mashruwala
(74) *Attorney, Agent, or Firm* — Montgomery Patent and Design; Robert C. Montgomery

(57) ABSTRACT

An apparatus to assist in cooking over a campfire is herein disclosed, comprising a generally "Y"-shaped support that rests over an open fire by means of three (3) legs. An adjustable steel cable, controlled by a mechanically-operated winch, is provided at the center of the "Y"-shaped support, which depends downward and connects centrally to four (4) chains, each of which connects to a corner of a rectangular grilling surface. The grilling surface comprises a heat-resistant material and can be made in varying dimensions. The grilling surface is height-adjustable to accommodate cooking needs and fire output permits. Once cooled, the apparatus can be disassembled and transported in a supplied pouch or hard case.

16 Claims, 3 Drawing Sheets

PORTABLE AND ADJUSTABLE GRILLING APPARATUS FOR OUTDOOR COOKING

RELATED APPLICATIONS

The present invention was first described in a notarized Official Record of Invention on Jun. 13, 2007, that is on file at the offices of Montgomery Patent and Design, LLC, the entire disclosures of which are incorporated herein by reference.

FIELD OF THE INVENTION

The present invention relates generally to an apparatus to assist in cooking over a heat source and, more particularly, to said apparatus comprising a generally "Y"-shaped support that rests over an open fire by means of three (3) legs, and an adjustable steel cable controlled by a mechanically-operated winch provided at the center of the "Y"-shaped support which depends downward and connects centrally to four (4) chains, each of which connects to a corner of a rectangular grilling surface.

BACKGROUND OF THE INVENTION

Whether cooked on a grill or over a campfire, food cooked outdoors just always seems to taste better than food cooked indoors. It could be the outdoor air, cooking procedures or a hundred other items, but one's taste buds just seem to explode. Many people who cook outdoors as part of a camping trip use a grill, which must be brought along for the trip, including fuel, legs, cooking surfaces and the like. Even those who cook on a campfire must bring a complicated stand with multiple legs that seem to collapse, and are never long enough to place food high above a fire. Another option is a complicated tripod arrangement which is difficult to set up and then can only be used with a kettle. All of these solutions are either complicated, difficult to store, hard to transport, and/or require many solutions depending on the type of food being cooked. Accordingly, there exists a need for a means by which virtually any type of food can be cooked over a campfire without the disadvantages as described above. The development of the invention herein fulfills this need.

The present invention is an apparatus to assist in cooking over a campfire. The apparatus comprises a generally "Y"-shaped fitting supported over an open fire by use of three (3) leg assemblies. Each leg assembly is approximately four (4) feet tall. An adjustable steel cable, controlled by a mechanically operated winch, is provided at the center of the "Y"-shaped support. This steel cable then hangs down and connects centrally to four (4) connection chains, each of which connects to the corner of a rectangular shaped grilling surface. As such, the height of the grilling surface can easily be adjusted up and down over the open flame as cooking needs or fire output permits. The grilling surface is made of a heat resistant material and is approximately twenty-four (24) by thirty-four (34) inches, although other sizes are envisioned as well. When finished, the apparatus is allowed to cool and then is easily disassembled and transported in a supplied travel bag, thereby providing a means to cook almost any type of food over an open campfire in a manner which is quick, easy and effective.

Several attempts have been made in the past to provide portable grill assemblies. U.S. Pat. No. 4,732,138, issued in the name of Vos, describes a campfire cooker assembly including a tripod and grill structure, a fire bowl, and a smoker. However, unlike the present invention, the Vos cooker is not collapsible.

U.S. Pat. No. 5,297,534, issued in the name of Louden, discloses a barbecue grill apparatus arranged for selective rotation and positioning over an associated barbecue grill pit structure. However, unlike the present invention, the Louden grill only has one (1) leg secured to the ground and swings on a pivot. Furthermore, the Louden grill does not have an adjustable cable controlled by a mechanically-operated winch.

U.S. Pat. No. 5,908,026, issued in the name of Forst, discloses a portable vertical rotary grill that includes a support structure, a power source, a motor, and a grill. However, unlike the present invention, the Forst grill has a power source and a motor. Furthermore, the Forst grill is not collapsible, and it does not have an adjustable cable controlled by a mechanically-operated winch.

U.S. Pat. No. 5,931,085, issued in the name of Benzschawel, discloses a portable adjustable grill apparatus for cooking over a source of heat that includes at least three (3) grill legs. However, unlike the present invention, the Benzschawel grill is adjustable by a cable with a slide lock on a leg. Furthermore, the Benzschawel grill does not have an adjustable cable controlled by a mechanically-operated winch.

U.S. Pat. No. 5,944,009, issued in the name of Scheller, discloses a portable outdoor grill which permits adjustment of a food support platform in three (3) dimensions. However, unlike the present invention, the Scheller grill only has one (1) leg staked to a ground and it uses a chain lock to raise and lower the cooking platform. Furthermore, the Scheller grill does not have an adjustable cable controlled by a mechanically-operated winch.

Additionally, various ornamental designs for portable grill assemblies have been provided, particularly, U.S. Pat. Nos. D 271,740, D 315,846, D 337,933. However, none of these designs are similar to the present invention.

The prior art appears to disclose various portable grill assemblies. However, none of the prior art particularly describes an apparatus to assist in cooking over a campfire comprising a generally "Y"-shaped support that rests over an open fire by means of three (3) legs, an adjustable steel cable controlled by a mechanically-operated winch provided at the center of the "Y"-shaped support which depends downward and connects centrally to four (4) chains, each of which connects to a corner of a rectangular grilling surface that the instant invention possesses. Accordingly, there exists a need for a means by which virtually any type of food can be cooked over a campfire without the disadvantages as described above.

SUMMARY OF THE INVENTION

In view of the foregoing disadvantages inherent in the prior art, it has been observed that there is need for an apparatus to assist in cooking over a campfire comprising a generally "Y"-shaped support that rests over an open fire by means of three (3) legs, an adjustable steel cable controlled by a mechanically-operated winch provided at the center of the "Y"-shaped support which depends downward and connects centrally to four (4) chains, each of which connects to a corner of a rectangular grilling surface.

To achieve the above objectives, it is an object of the present invention to provide a portable and adjustable outdoor cooking apparatus comprising a "Y"-shaped base, a first leg assembly extending vertically downward therefrom the base, a second leg assembly extending vertically downward therefrom the base, a third leg assembly extending vertically downward therefrom the base, a mechanically-operated winch mounted on the stem of the base, an adjustable cable controlled by the winch and connected at a first end to the winch and traverses along the base therethrough an aperture and connects at a second end to a grill surface wherein the cable provides a means of transferring horizontal adjustment from the winch to vertical adjustment of the grill surface.

It is an object of the present invention that the apparatus provides a means for vertical adjustability thereby enabling a user to control an amount of heat thereto a grill surface when cooking over an open heat source.

A further object of the present invention is having the "Y"-shaped base comprise a stem, a first base arm that extends horizontally outward at an angle therefrom the stem, and a second base arm that extends horizontally outward at an angle therefrom the stem.

Another object of the present invention is having the first leg assembly extend vertically downward therefrom the base and comprises a first upper leg section removably attached to the first base arm of the base and a first lower leg section movably attached to the first upper leg section thereby allowing a user to adjust a length of the first leg assembly allowing the apparatus to be used on uneven surfaces.

Yet another object of the present invention is having the second leg assembly extend vertically downward therefrom the base and comprises a second upper leg section removably attached to the second base arm of the base and a second lower leg section movably attached to the second upper leg section thereby allowing a user to adjust a length of the second leg assembly allowing the apparatus to be used on uneven surfaces.

Still yet another object of the present invention is having the third leg assembly extend vertically downward therefrom the base and comprises a third upper leg section removably attached to the stem of the base and a third lower leg section movably attached to the third upper leg section thereby allowing a user to adjust a length of the first leg assembly allowing the apparatus to be used on uneven surfaces.

Still yet another object of the present invention is having the apparatus further comprise a first mounting bracket comprising a first locking mechanism located along a lower surface of an end portion of the first base arm of the base which removably attaches the first base arm of the base to the first upper leg section, a second mounting bracket comprising a second locking mechanism located along a lower surface of an end portion of the second base arm of the base which removably attaches the second base arm of the base to the second upper leg section, and a third mounting bracket comprising a third locking mechanism located along a lower surface of an end portion of the stem of the base which removably attaches the stem of the base to the third upper leg section.

Yet still another object of the present invention is having the apparatus further comprise a first leg assembly locking mechanism that locks the first lower leg section and the first upper leg section at a desired length, a second leg assembly locking mechanism that locks the second lower leg section and the second upper leg section at a desired length, and a third leg assembly locking mechanism that locks the third lower leg section and the third upper leg section at a desired length.

Still another object of the present invention is having the apparatus further comprise a connection plate comprising a hook which enables a user to removably attach the connection plate to an end portion of the cable and at least one (1) connection chain that removably attaches the connection plate to outside edges of the grill surface.

Still yet another object of the present invention is having the apparatus further comprise a first folding extension having a first lip pivotally connected to the first base arm of the base at a first pivot point by a first fastener, wherein the first lip provides a horizontal rigidity to the first folding extension and the base and a second folding extension having a second lip pivotally connected to the second base arm of the base at a second pivot point by a second fastener, wherein the second lip provides a horizontal rigidity to the second folding extension and the base.

Yet another object of the present invention is having the apparatus further comprise a winch crank that operates the winch and a locking notch which secures the winch crank in a locked position when a desired vertical position of the grill surface is obtained.

Still yet another object of the present invention is having the first lower leg section, the second lower leg section, and the third lower leg section each comprise a pointed tip at an extended end thereby allowing the apparatus to sit on top of ground or pierce said top of ground as appropriate for use.

Still yet another object of the present invention is having the apparatus comprise four (4) connection chains.

Yet still another object of the present invention is having the first leg assembly, the second leg assembly, and the third leg assembly each are approximately four (4) feet long when completely extended.

Still another object of the present invention is having the grill surface approximately eighteen (18) inches by thirty four (34) inches.

Still yet another object of the present invention is having the base made of heat resistant metal channeling.

Yet another object of the present invention is having the grill surface made of heat resistant material.

Still another object of the present invention is having the cable made of a heat resistant material.

Yet another object of the present invention is having the mounting brackets attached thereto the base by welding, soldering, brazing, or a similar attachment method.

Still another object of the present invention is having the apparatus further comprise a travel bag wherein the apparatus fits therein when the apparatus is in a collapsed and folded state for convenient storage and transport.

Still another object of the present invention is having the travel bag comprise a length of approximately thirty-four (34) inches, a width of approximately eighteen (18) inches, a thickness of approximately four (4) inches, an opening that allows the apparatus to be inserted therethrough, a draw string that pulls close the opening, a clamp that holds the draw string tight, at least one (1) tote handle for carrying the travel bag.

Yet another object of the present invention is having the clamp a spring loaded clamping mechanism.

Still another object of the present invention is having the travel bag made of burlap.

Yet another object of the present invention is providing a method for using a portable and adjustable apparatus for cooking.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
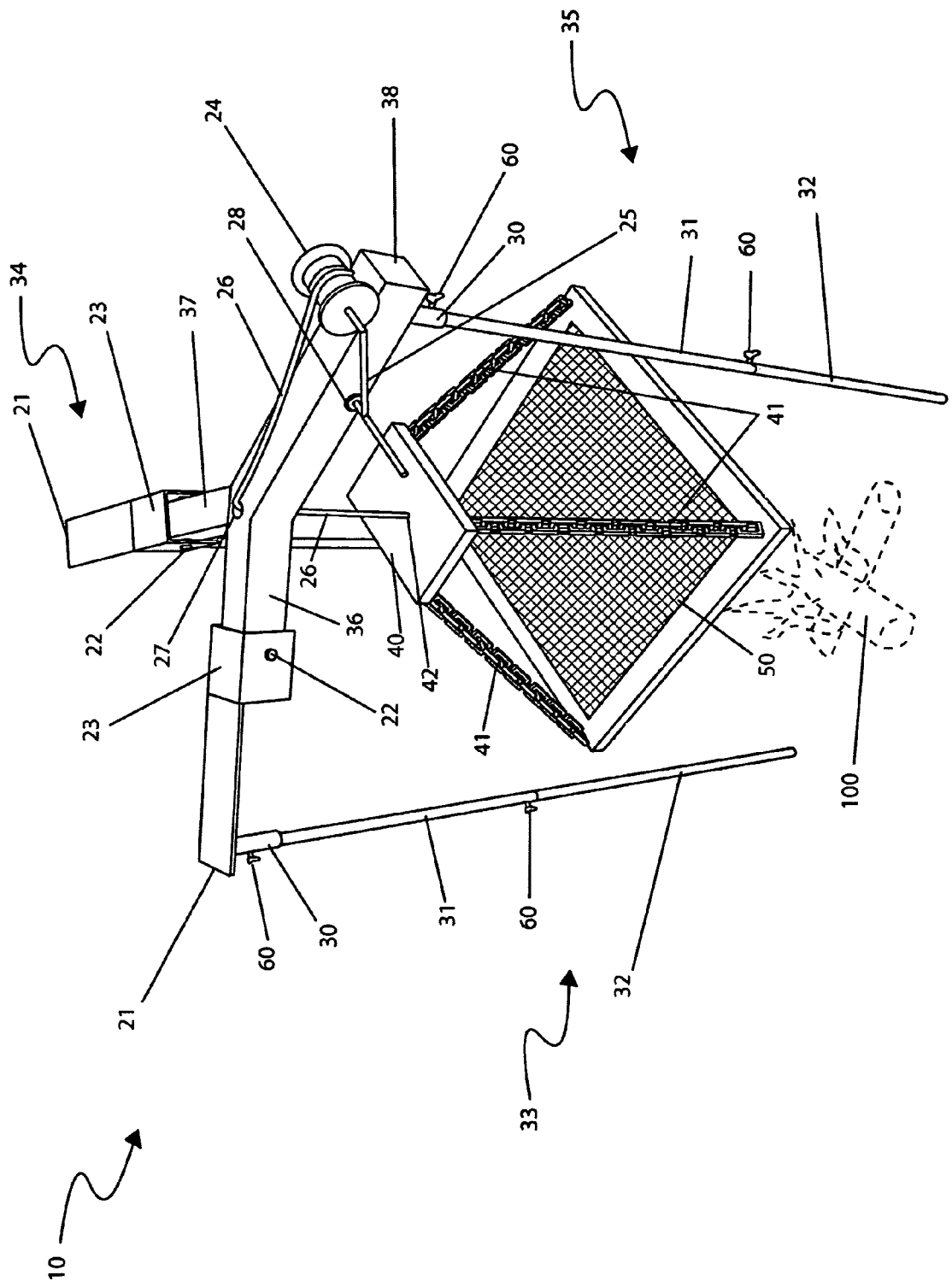
FIG. 1 is an environmental view of a portable adjustable outdoor grill 10, according to a preferred embodiment of the present invention.

DESCRIPTIVE KEY 10 portable adjustable outdoor grill
20 base
21 folding extension
22 pivot point
23 lip
24 winch
25 winch crank
26 cable
27 aperture
28 notch
30 mounting bracket
31 upper leg section
32 lower leg section
33 first leg assembly
34 second leg assembly
35 third leg assembly
36 first base arm
37 second base arm
38 base stem
40 connection plate
41 connection chain
42 hook
50 grill surface
60 locking mechanism
80 travel bag
81 opening
82 draw string
83 clamp
84 tote handles
100 heat source

DETAILED DESCRIPTION OF THE PREFERRED EMBODIMENT

Figure 2:
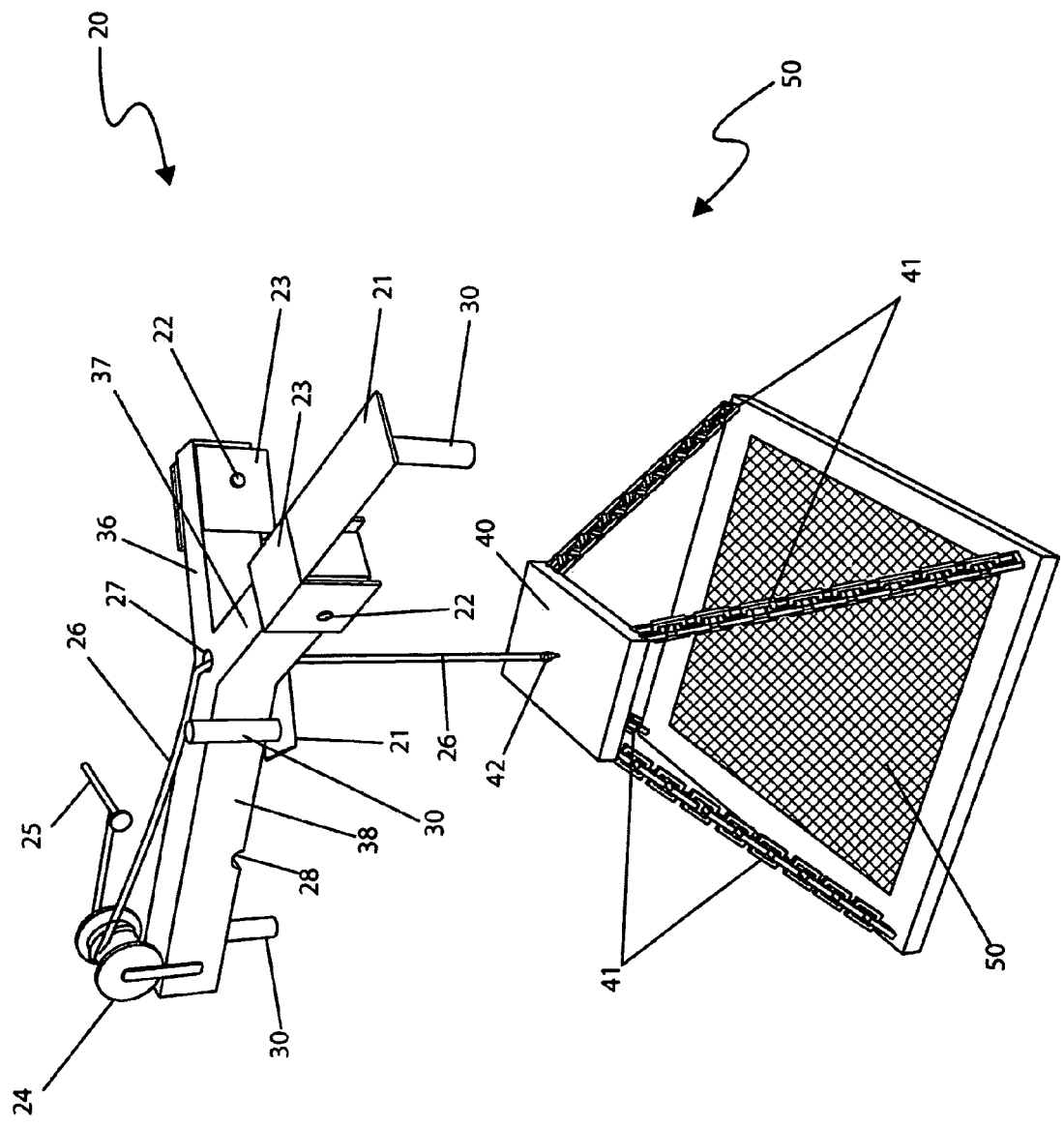
FIG. 2 is a side perspective view of a base 20 and a grill surface 50, according to a preferred embodiment of the present invention; and, FIG. 3 is a front perspective view of a travel bag 80, according to a preferred embodiment of the present invention.
Figure 3:
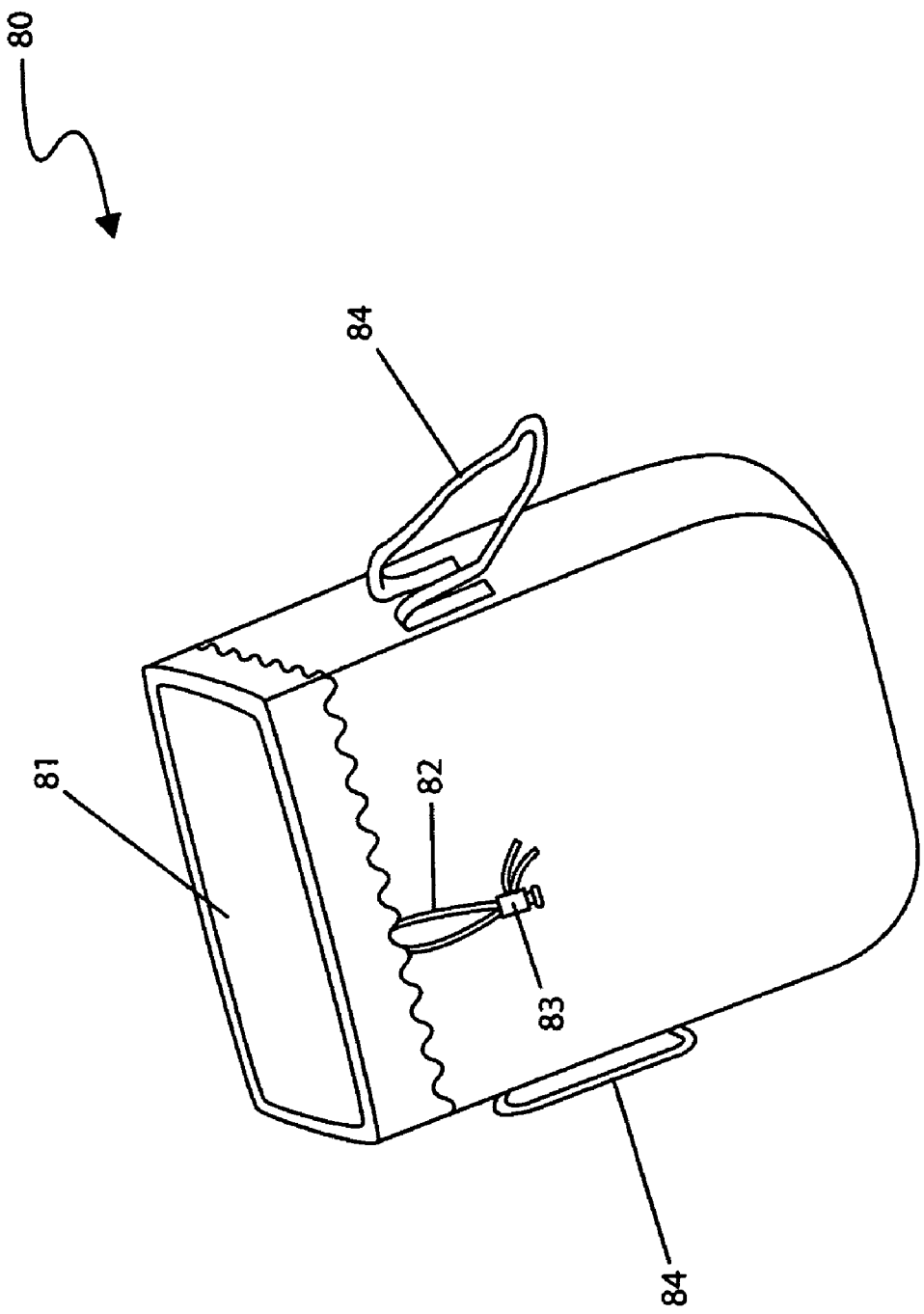

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a portable adjustable outdoor grill (herein described as the "apparatus") 10, providing a means for vertical adjustability thereby enabling a user to control an amount of heat thereto the contents on a grill surface 50 when cooking over an open heat source 100. The apparatus 10 comprises a generally "Y"-shaped base 20 supported by a first leg assembly 33, a second leg assembly 34, and a third leg assembly 35, which rest over a campfire 100, an adjustable cable 26 controlled by a mechanically-operated winch 24, and four (4) connection chains 41 each of which connect to a corner of a rectangular grill surface 50 and are operated by said winch 24.

Referring now to FIG. 1, an environmental view of the apparatus 10, according to the preferred embodiment of the present invention, is disclosed. The apparatus 10 comprises a generally "Y"-shaped base 20 which comprises a first base arm 36, a second base arm 37, and a base stem 38. The base 20 is preferably made of square heat resistant metal channeling; however, it is understood the base 20 can be made of other material such as but not limited to: "U"-shaped channeling, metal tubing, or the like providing equal benefit, and as such should not be viewed as a limiting factor of the invention 10. The base 20 further comprises a folding extension 21, envisioned to be made of "U"-shaped heat resistant metal channeling which flattens as it extends outwards and is located on a radial end of the first base arm 36 and the second base arm 37 of the "Y"-shaped base 20. The folding extension 21 provides an attachment means thereat a pivot point 22 using common fasteners such as a bolt, rivet, or the like. The folding extension 21 is envisioned to envelop the first base arm 36 and the second base arm 37 of the base 20 when folded, allowing for more convenient storage. The folding extension 21 comprises a lip 23 which is envisioned to provide horizontal rigidity thereto the extension 21 and the base 20 when unfolded. The apparatus 10 comprises a mechanically-operated winch 24 which is envisioned to be mounted on the base stem 38. The winch 24 is envisioned to be attached to the base 20 via an attachment means such as welding, soldering, brazing, or the like. The winch 24 is envisioned to be operated using a "Z"-shaped winch crank 25. The apparatus 10 also comprises a locking notch 28 which is envisioned to engage and secure the winch crank 25 and provide a means for locking the movement of the winch 24 thus locking a desired vertical position of the grill surface 50. The apparatus 10 also comprises a cable 26 which is attached to the winch 24 in a normal manner and provides a means for vertical adjustment of the grill surface 50. The cable 26 is envisioned as being a heat resistant material. The cable 26 is envisioned to traverse through the base 20 therethrough an aperture 27 providing a means of transferring horizontal adjustment from the winch 24 to vertical adjustment of the grill surface 50. The apparatus 10 provides three (3) hollow, tubular mounting brackets 30 providing a means to attach the base 20 to the upper leg sections 31. The mounting bracket 30 is envisioned to have a female end and be located along a lower surface along end portions of the base 20. The mounting brackets 30 are envisioned to be attached thereto the base 20 by an attachment means such as welding, soldering, brazing, or the like. Each mounting bracket 30 comprises a locking mechanism 60 which is envisioned to lock an upper leg section 31 into the mounting bracket 30. The locking mechanism 60 is preferably a common lockbolt or the like; however, it is understood that other locking mechanisms may be provided such as, but not limited to: a common bolt, a spring pin, or the like, offering equal benefit and as such should not be viewed as a limiting factor of the invention 10. The apparatus 10 also comprises a lower leg section 32 envisioned to be smaller in diameter than the upper leg section 31 thereby allowing the lower leg section 32 to telescope from the upper leg section 31 adjusting the overall length of the leg assembly thereby allowing the apparatus 10 to be used on uneven surfaces. The lower leg section 32 is envisioned to have a pointed tip on the extended end allowing the apparatus 10 to sit on top of the ground or pierce the top of the ground as appropriate for use. The upper leg sections 31 are envisioned to have a male end which is inserted into the female end of the mounting bracket 30. The upper leg sections 31 and lower leg sections 32 are envisioned to be approximately four (4) feet long when completely extended and collapse for convenient storage. The lower leg section 32 is locked to the upper leg section 31 at an appropriate length using the locking mechanism 60. The apparatus 10 also comprises a connection plate 40. The connection plate 40 is attached to an end portion of the cable 26. The connection plate 40 comprises a hook 42 which enables the cable 26 to be attached to and removed from the connection plate 40 allowing for convenient storage. The apparatus 10 comprises four (4) connection chains 41 each comprised of heat resistant, light weight chain, however, it is understood the connection chains 41 may be introduced using a variety of materials such as heat resistant cable and, as such, should not be viewed as a limiting factor of the invention 10. The connection chain 41 joins the connection plate 40 thereto outside edges of a grill surface 50. The grill surface 50 is envisioned to be approximately eighteen (18) inches by thirty-four (34) inches and made of heat resistant material; however, it is understood that the grill surface 50 may be introduced in a variety of other dimensions and materials such as, but not limited to: copper, aluminum, stainless steel, non-stick coated, or the like, and as such should not be viewed as a limiting factor of the invention 10. The grill surface 50 is envisioned to be removable to allow for easy cleaning.

Referring now to FIG. 2, a side perspective view of the base 20 and the grill surface 50, according to the preferred embodiment of the present invention, is disclosed. The base 20 is illustrated here being connected to the grill surface 50 via the cable 26 (leg sections 31, 32 are omitted). FIG. 2 also shows one (1) of the folding extensions 21 in a collapsed position such as when the apparatus 10 is being stored.

Referring now to FIG. 3, a front perspective view of a travel bag 80, according to the preferred embodiment of the present invention, is disclosed. The apparatus 10 is envisioned to fold and collapse for ease of storage in a travel bag 80. The travel bag 80 is preferably made of a durable material such as, but not limited to: burlap or the like. The travel bag 80 is envisioned having suitable dimensions to adequately store the apparatus 10 when collapsed, as well as commonly associated cooking utensils and implements. The apparatus 10 is envisioned to have the dimensions of approximately four (4) inches thick by eighteen (18) inches wide by thirty-four (34) inches long when stored. The travel bag 80 comprises an opening 81 in which the apparatus 10 is inserted once collapsed. The opening 81 is pulled closed using a draw string 82. The draw string 82 is held tight using a clamp 83. The clamp 83 comprises a common spring loaded clamping mechanism. The travel bag 80 also comprises two (2) tote handles 84.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1 through 3.

The method of installing and utilizing the apparatus 10 may be achieved by performing the following steps: removing the apparatus 10 from a travel bag 80; unfolding each of the folding extension portions 21 of the base 20; inserting the male end of each of the upper leg portions 31 into the female end of each of the mounting brackets 30 thus creating a tripod set-up; locking each of the upper leg portions 31 into each of the mounting brackets 30 by tightening the locking mechanism 60; extending each of the telescoping lower leg sections 32 from the upper leg sections 31 to the appropriate length according to the terrain slope thereby creating a level grill surface 50; locking each of the lower leg sections 32 and the upper leg sections 31 in position by tightening the locking mechanism 60; attaching the grill surface 50 thereto each of the four (4) connection chains 41; connecting the cable 26 to the connection plate 40; building and lighting a fire 100 under the grill surface 50; placing food to be cooked on the grill surface 50; rotating the winch crank 25 which provides mechanical power to operate the winch 24, rotating the winch crank 25 clock-wise to wind the cable 25 around the winch 24 thus raising the grill surface 50 during cooking; rotating the winch crank 25 counter clock-wise to unwind the cable 25 from the winch 24 thus lowering the grill surface 50 during cooking; raising and lowering the grill surface 50 enables a user to control the amount of heat from the flame 100 when cooking; placing the winch crank 25 into the notch 28 providing a lock for the movement of the winch 24; cooking food for desired time; removing food from the grill surface 50 once cooked; letting the grill surface 50 cool; detaching the connection plate 40 from the cable 26; detaching each of the connection chains 41 from the grill surface 50, providing ease in cleaning; loosening each of the locking mechanisms 60 which lock the upper leg sections 31 to the mounting brackets 30; removing the upper leg sections 31 from the mounting brackets 30; loosening each of the locking mechanisms 60 thus unlocking the upper leg sections 31 from the lower leg sections 32; collapsing the leg sections 31, 32 to the shortest position; folding each of the folding extensions 21 so said extension 21 collapses in on the first base arm 36 and the second base arm 37; rotating the winch crank 25 clock-wise thus raising the cable 25; and placing apparatus 10 in the travel bag 80.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable and adjustable grill apparatus for cooking, comprising:
 a "Y"-shaped base comprising:
  a stem;
  a first base arm extending horizontally outward at an angle therefrom said stem; and,
  a second base arm extending horizontally outward at an angle therefrom said stem;
 a first leg assembly extending vertically downward therefrom said base comprising:
  a first upper leg section removably attached to said first base arm of said base; and,
  a first lower leg section adjustably attached to said first upper leg section;

a second leg assembly extending vertically downward therefrom said base comprising:
  a second upper leg section removably attached to said second base arm of said base; and,
  a second lower leg section adjustably attached to said second upper leg section;
a third leg assembly extending vertically downward therefrom said base comprising:
  a third upper leg section removably attached to said stem of said base; and,
  a third lower leg section adjustably attached to said third upper leg section;
a mechanically-operated rotary winch mounted on said stem of said base; and,
an adjustable cable controlled by said winch and connected at a first end to said winch, traversing along said base therethrough an aperture and connecting at a second end to a grill surface,
wherein said apparatus provides a means for vertical adjustability thereby enabling a user to control an amount of heat thereto said grill surface when cooking over an open heat source;
wherein said first lower leg section allows a user to adjust a length of said first leg assembly allowing said apparatus to be used on uneven surfaces;
wherein said second lower leg section allows a user to adjust a length of said second leg assembly allowing said apparatus to be used on uneven surfaces;
wherein said third lower leg section allows a user to adjust a length of said third leg assembly allowing said apparatus to be used on uneven surfaces;
wherein said cable provides a means of transferring horizontal adjustment from said winch to vertical adjustment of said grill surface and;
wherein said apparatus further comprises: a first folding extension having a first lip pivotally connected to said first base arm of said base at a first pivot point by a first fastener, wherein said first lip provides a horizontal rigidity to said first folding extension and said base; and, a second folding extension having a second lip pivotally connected to said second base arm of said base at a second pivot point by a second fastener, wherein said second lip provides a horizontal rigidity to said second folding extension and said base.

2. The apparatus of claim 1, wherein said apparatus further comprises:
  a first mounting bracket comprising a first locking mechanism located along a lower surface of an end portion of said first base arm of said base which removably attaches said first base arm of said base to said first upper leg section;
  a second mounting bracket comprising a second locking mechanism located along a lower surface of an end portion of said second base arm of said base which removably attaches said second base arm of said base to said second upper leg section; and,
  a third mounting bracket comprising a third locking mechanism located along a lower surface of an end portion of said stem of said base which removably attaches said stem of said base to said third upper leg section.

3. The apparatus of claim 2, wherein said apparatus further comprises:
  a first leg assembly locking mechanism that locks said first lower leg section and said first upper leg section at a desired length;
  a second leg assembly locking mechanism that locks said second lower leg section and said second upper leg section at a desired length; and,
  a third leg assembly locking mechanism that locks said third lower leg section and said third upper leg section at a desired length.

4. The apparatus of claim 3, wherein said apparatus further comprises:
  a connection plate comprising a hook which enables a user to removably attach said connection plate to an end portion of said cable; and,
  at least one (1) connection chain that removably attaches said connection plate to outside edges of said grill surface.

5. The apparatus of claim 1, wherein said apparatus further comprises:
  a winch crank that operates said winch; and,
  a locking notch which secures said winch crank in a locked position when a desired vertical position of said grill surface is obtained.

6. The apparatus of claim 1, wherein said first lower leg section, said second lower leg section, and said third lower leg section each comprise a pointed tip at an extended end thereby allowing said apparatus to sit on top of ground or pierce said top of ground as appropriate for use.

7. The apparatus of claim 1, wherein said apparatus comprises four (4) connection chains.

8. The apparatus of claim 7, wherein said first leg assembly, said second leg assembly, and said third leg assembly each are approximately four (4) feet long when completely extended.

9. The apparatus of claim 7, wherein said grill surface is approximately eighteen (18) inches by thirty-four (34) inches.

10. The apparatus of claim 7, wherein said base, said grill surface, and said cable are each made of heat resistant metal channeling.

11. The apparatus of claim 7, wherein said mounting brackets are attached thereto said base by one of the following methods: welding, soldering, or brazing.

12. The apparatus of claim 7, further comprising a travel bag wherein said apparatus fits therein when said apparatus is in a collapsed and folded state for convenient storage and transport, said travel bag comprising:
  a length of approximately thirty-four (34) inches;
  a width of approximately eighteen (18) inches;
  a thickness of approximately four (4) inches;
  an opening that allows said apparatus to be inserted therethrough;
  a draw string that pulls close said opening;
  a clamp that holds said draw string tight; and,
  at least one (1) tote handle for carrying said travel bag.

13. The apparatus of claim 12, wherein said clamp is a spring loaded clamping mechanism.

14. The apparatus of claim 13, wherein said travel bag is made of burlap.

15. A portable and adjustable apparatus for cooking, comprising:
  a "Y"-shaped base comprising:
    a stem;
    a first base arm extending horizontally outward at an angle therefrom said stem; and,
    a second base arm extending horizontally outward at an angle therefrom said stem;
  a first leg assembly extending vertically downward therefrom said base comprising:
    a first upper leg section removably attached to said first base arm of said base; and, a first lower leg section adjustably attached to said first upper leg section;

a second leg assembly extending vertically downward therefrom said base comprising:
  a second upper leg section removably attached to said second base arm of said base; and,
  a second lower leg section adjustably attached to said second upper leg section;

a third leg assembly extending vertically downward therefrom said base comprising:
  a third upper leg section removably attached to said stem of said base; and,
  a third lower leg section adjustably attached to said third upper leg section;

a mechanically-operated winch mounted on said stem of said base;

an adjustable cable controlled by said winch and connected at a first end to said winch, traversing along said base therethrough an aperture and connecting at a second end to a grill surface;

a first mounting bracket comprising a first locking mechanism located along a lower surface of an end portion of said first base arm of said base which removably attaches said first base arm of said base to said first upper leg section;

a second mounting bracket comprising a second locking mechanism located along a lower surface of an end portion of said second base arm of said base which removably attaches said second base arm of said base to said second upper leg section;

a third mounting bracket comprising a third locking mechanism located along a lower surface of an end portion of said stem of said base which removably attaches said stem of said base to said third upper leg section;

a first leg assembly locking mechanism that locks said first lower leg section and said first upper leg section at a desired length;

a second leg assembly locking mechanism that locks said second lower leg section and said second upper leg section at a desired length;

a third leg assembly locking mechanism that locks said third lower leg section and said third upper leg section at a desired length;

a connection plate comprising a hook which enables a user to removably attach said connection plate to an end portion of said cable;

at least one (1) connection chain that removably attaches said connection plate to outside edges of said grill surface;

a first folding extension having a first lip pivotally connected to said first base arm of said base at a first pivot point by a first fastener, wherein said first lip provides a horizontal rigidity to said first folding extension and said base;

a second folding extension having a second lip pivotally connected to said second base arm of said base at a second pivot point by a second fastener, wherein said second lip provides a horizontal rigidity to said second folding extension and said base;

a winch crank that operates said winch; and, a locking notch which secures said winch crank in a locked position when a desired vertical position of said grill surface is obtained;

wherein said apparatus provides a means for vertical adjustability thereby enabling a user to control an amount of heat thereto said grill surface when cooking over an open heat source;

wherein said first lower leg section allows a user to adjust a length of said first leg assembly allowing said apparatus to be used on uneven surfaces;

wherein said second lower leg section allows a user to adjust a length of said second leg assembly allowing said apparatus to be used on uneven surfaces;

wherein said third lower leg section allows a user to adjust a length of said third leg assembly allowing said apparatus to be used on uneven surfaces; and, wherein said cable provides a means of transferring horizontal adjustment from said winch to vertical adjustment of said grill surface.

16. The apparatus of claim 15, wherein said first lower leg section, said second lower leg section, and said third lower leg section comprise a pointed tip at an extended end thereby allowing said apparatus to sit on top of ground or pierce said top of ground as appropriate for use.

* * * * *